United States Patent
Maripina et al.

(10) Patent No.: US 12,154,357 B2
(45) Date of Patent: Nov. 26, 2024

(54) MACHINE LEARNING (ML)-BASED SYSTEM AND METHOD FOR CORRECTING IMAGE DATA

(71) Applicant: HIGHRADIUS CORPORATION, Houston, TX (US)

(72) Inventors: Hashwanth Maripina, Hyderabad (IN); Mohit Bansal, Hyderabad (IN); Abhik Das Mahapatra, Hyderabad (IN); Shrey Chirag Shah, Hyderabad (IN)

(73) Assignee: HIGHRADIUS CORPORATION, Houston, TX (US)

( * ) Notice: Subject to any disclaimer, the term of this patent is extended or adjusted under 35 U.S.C. 154(b) by 356 days.

(21) Appl. No.: 17/817,677

(22) Filed: Aug. 5, 2022

(65) Prior Publication Data

US 2024/0046680 A1 Feb. 8, 2024

(51) Int. Cl.
*G06K 9/00* (2022.01)
*G06V 30/146* (2022.01)
*G06V 30/19* (2022.01)

(52) U.S. Cl.
CPC .... *G06V 30/19167* (2022.01); *G06V 30/1463* (2022.01)

(58) Field of Classification Search
CPC .. G06V 30/1463; G06V 30/373; G06V 30/10; G06V 30/262; G06V 30/413; G06V 30/19167; G06V 10/82; G06V 30/1916; G06V 30/26; G06N 20/00; G06N 5/04; G06N 20/10; G06N 3/08
See application file for complete search history.

(56) References Cited

U.S. PATENT DOCUMENTS

| | | | |
|---|---|---|---|
| 6,738,153 B1 | 5/2004 | Aschenbrenner et al. | |
| 2020/0327351 A1* | 10/2020 | Abedini | G06N 20/00 |
| 2021/0056364 A1 | 2/2021 | Toizumi | |
| 2022/0350998 A1* | 11/2022 | Desai | G06N 3/0442 |
| 2023/0342968 A1 | 10/2023 | Chen et al. | |

OTHER PUBLICATIONS

Shang, J., Liu, C., & Ding, X. (Jan. 2007). OCR result optimization based on pattern matching. In Document Recognition and Retrieval XIV (vol. 6500, pp. 74-81). SPIE. (Year: 2007).*

(Continued)

*Primary Examiner* — Utpal D Shah
*Assistant Examiner* — Kevin M Coomber
(74) *Attorney, Agent, or Firm* — Jason C. Cameron

(57) ABSTRACT

A system and method for correcting image data is disclosed. The method includes receiving one or more documents from one or more electronic mediums. The method further includes determining a primary character and one or more alternate characters corresponding to the mis-captured character image, extracting one or more confident instances of the primary character and the one or more alternate characters from the one or more documents and generating one or more scores corresponding to the primary character and the one or more alternate characters. Further, the method includes predicting a correct character corresponding to the mis-captured character image by using a trained image prediction-based ML model and automatically replacing the mis-captured character image with the predicted correct character.

20 Claims, 15 Drawing Sheets

(56) References Cited

OTHER PUBLICATIONS

Junqing Shang, Changsong Liu, Xiaoqing Ding State Key Laboratory of Intelligent Technology and Systems Department of Electronic Engineering, Tsinghua University, Beijing, China, 100084; OCR Result Optimization Based on Pattern Matching.

Ghada Sokar, Prof. Elsayed E. Hemayed and Dr. Mohamed Rehan; A Generic OCR Using Deep Siamese Convolution Neural Networks.

* cited by examiner

| DATE | INVOICE | PO# | INV AMT | DISCOUNT | AMT PAID |
|---|---|---|---|---|---|
| 09/02/20 | 19954 | | 813.75 | 0.00 | 813.75 |
| | Totals: | | 813.75 | 0.00 | 813.75 |

S19954

CHECK NO:   CHECK DATE: 09/25/20   VENDOR:   CHECK TOTAL:   813.75

FIG. 4A

| No. of Words Validated (Changes Suggested by System) | True Positives | False Positives | Non-Deterministic |
|---|---|---|---|
| 409 | 100 | 44 | 265 |

FIG. 8B

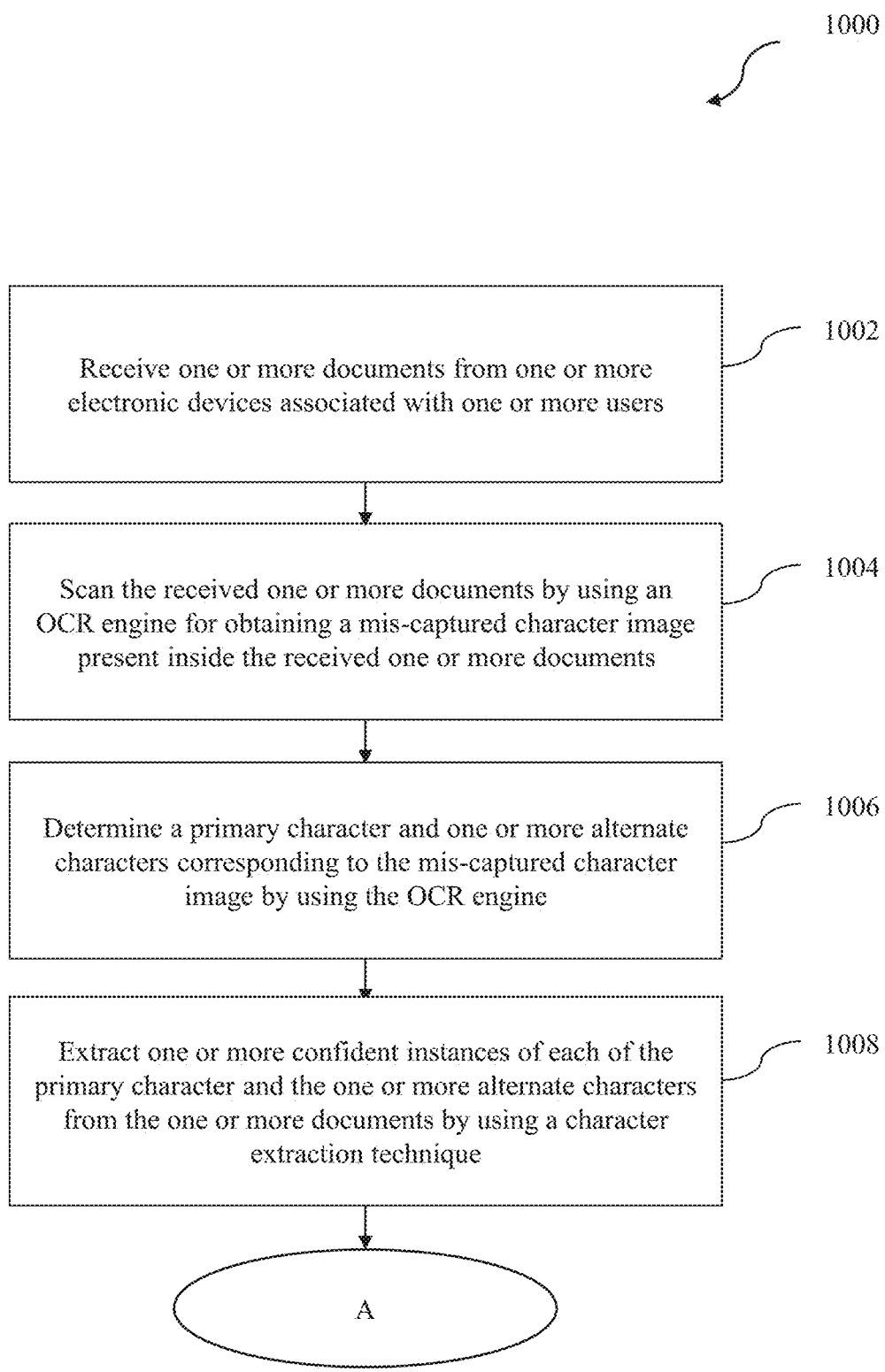
FIG. 10 (contd)

MACHINE LEARNING (ML)-BASED SYSTEM AND METHOD FOR CORRECTING IMAGE DATA

FIELD OF INVENTION

Embodiments of the present disclosure relate to ML (Machine Learning)-based processing systems and more particularly relates to a system and a method for correcting image data.

BACKGROUND

Generally, a document processing system, such as an Optical Character Recognition (OCR) engine scans multiple documents and processes the scanned multiple documents to extract relevant information. The multiple documents include pre-printed templates including predefined fields filed by hand or machine printed characters. The OCR engine reads content of the predefined fields and extracts the information from the predefined fields of the multiple documents. However, it is very crucial that the information in the multiple documents is read and extracted correctly. Generally, the OCR engine generates a confidence rating for its reading of each character in the one or more documents. Thus, the OCR engine requires a manual verification of OCR results. Further, operators verify the OCR results by reviewing all fields in the multiple documents and correcting errors discovered in the OCR results, or by viewing and correcting characters with a low OCR confidence level. Thus, verification of the OCR results requires manual efforts from the operators and consumes a lot of time. Furthermore, when the quality of one or more documents is low, the OCR results are poor and inaccurate. For example, when an image is distorted or an improper scan from a poor-quality paper is prone to error. The OCR engine also fails to remove noises, such as black spaces, garbage values and the like, which leads to uncertainties in output. Further, the OCR engine generally mis-captures few of the similar looking characters, such as 'O' and '0', 'c' and 'e', '1' and 'I'.

Hence, there is a need for an improved Machine Learning (ML)-based system and method for correcting image data, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a Machine Learning (ML)-based computing system for correcting image data is disclosed. The computing system includes one or more hardware processors and a memory coupled to the one or more hardware processors. The memory includes a plurality of modules in the form of programmable instructions executable by the one or more hardware processors. The plurality of modules include a data receiver module configured to receive one or more documents from one or more electronic devices associated with one or more users. The plurality of modules include a character obtaining module configured to scan the received one or more documents by using an Optical Character Recognition (OCR) engine for obtaining a mis-captured character image present inside the received one or more documents. Further, the plurality of modules include a character determination module configured to determine a primary character and one or more alternate characters corresponding to the mis-captured character image by using the OCR engine. The plurality of modules also include a data extraction module configured to extract one or more confident instances of each of the primary characters and the one or more alternate characters from the one or more documents by using a character extraction technique. The plurality of modules includes a score generation module configured to generate one or more scores corresponding to each of the primary character and the one or more alternate characters based on a type of the primary character, a type of the one or more alternate characters, the mis-captured character image and the extracted one or more confident instances by using a determined ML model. Further, the plurality of modules includes a character determination module configured to predict a correct character corresponding to the mis-captured character image from the primary character and the one or more alternate characters by analyzing one or more document parameters, a predefined threshold score, a set of decision strategic rules and the generated one or more scores by using a trained image prediction-based ML model. The one or more document parameters comprise field of the one or more documents, context, font, document structure, focus area and upper curves of characters in the one or more documents, type of noise, background of the one or more documents, and ink quality. The plurality of modules also include a data replacement module configured to automatically replace the mis-captured character image with the predicted correct character.

In accordance with another embodiment of the present disclosure, a ML-based method for correcting image data is disclosed. The method includes receiving one or more documents from one or more electronic devices associated with one or more users. 110 The method includes scanning the received one or more documents by using an Optical Character Recognition (OCR) engine for obtaining a mis-captured character image present inside the received one or more documents. Further, the method includes determining a primary character and one or more alternate characters corresponding to the mis-captured character image by using the OCR engine. The method also includes extracting one or more confident instances of each of the primary characters and the one or more alternate characters from the one or more documents by using a character extraction technique. The method further includes generating one or more scores corresponding to each of the primary character and the one or more alternate characters based on type of the primary character, a type of the one or more alternate characters, the mis-captured character image and the extracted one or more confident instances by using a determined ML model. Further, the method includes predicting a correct character corresponding to the mis-captured character image from the primary character and the one or more alternate characters by analyzing one or more document parameters, a predefined threshold score, a set of decision strategic rules and the generated one or more scores by using a trained image prediction-based ML model. The one or more document parameters comprise the field of the one or more documents, context, font, document structure, focus area and upper curves of characters in the one or more documents, type of noise, background of the one or more documents, and ink quality. Furthermore, the method includes automatically replacing the mis-captured character image with the predicted correct character.

Embodiment of the present disclosure also provides a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 4A is an exemplary document depicting creation of training data for an image prediction-based ML model, in accordance with an embodiment of the present disclosure;

FIG. 8B is an exemplary table illustrating experiment results of the ML-based computing system, in accordance with another embodiment of the present disclosure;

Figure 1:
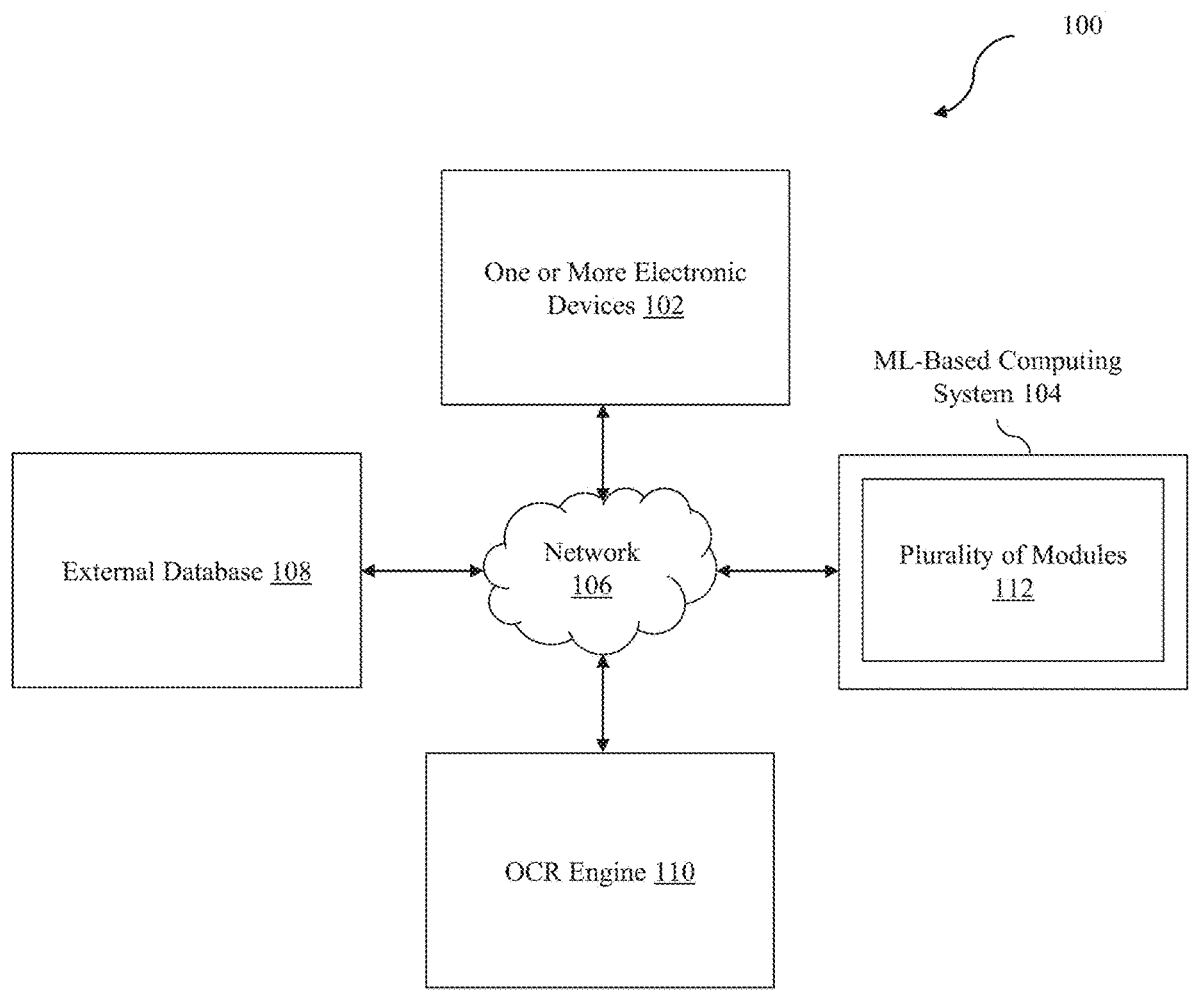
FIG. 1 is a block diagram illustrating an exemplary computing environment for correcting image data, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 10, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for correcting image data, in accordance with an embodiment of the present disclosure. According to FIG. 1, the computing environment 100 includes one or more electronic devices 102 associated with one or more users communicatively coupled to a Machine Learning (ML)-based computing system 104 via a network 106. In an exemplary embodiment of the present disclosure, the one or more users may include one or more analysts, business analysts, cash analysts, financial analysts, and the like. Further, the one or more electronic devices 102 are used by the one or more users for sending one or more documents to an Optical Character Recognition (OCR) engine 110. In an embodiment of the present disclosure, the one or more documents may be one or more invoices, one or more remittance documents and the like. In an embodiment of the present disclosure, the ML-based computing system automatically replaces a mis-captured character image with a correct character. Furthermore, the one or more electronic devices 102 may also used by the one or more users to receive recommendation corresponding to the correct character for the mis-captured character image. The ML-based computing system 104 may be hosted on a central server, such as cloud server or a remote server. Further, the network 106 may be a Wireless-Fidelity (Wi-Fi) connection, a hotspot connection, a Bluetooth connection, a local area network, a wide area network or any other wireless network. In an exemplary embodiment of the present disclosure, the one or more electronic devices 102 may include a laptop computer, desktop computer, tablet computer, smartphone, wearable device, smart watch and the like.

Further, the computing environment 100 includes an external database 108 communicatively coupled to the ML-based computing system 104 via the network 106. The external database 108 includes a set of documents. In an embodiment of the present disclosure, the set of documents are fetched from the external database 108 to train an image prediction-based ML model. In an exemplary embodiment of the present disclosure, the set of documents may be a set of invoices, a set of documents and the like. The computing environment 100 also includes the OCR engine 110 communicatively coupled to the ML-based computing system 104 via the network 106. In an embodiment of the present disclosure, the OCR engine 110 determines a primary character and one or more alternate characters corresponding to the mis-captured character image present inside one or more documents.

Furthermore, the one or more electronic devices 102 include a local browser, a mobile application or a combination thereof. Furthermore, the one or more users may use a web application via the local browser, the mobile application or a combination thereof to communicate with the ML-based computing system 104. In an embodiment of the present disclosure, the ML-based computing system 104 includes a plurality of modules 112. Details on the plurality of modules 112 have been elaborated in subsequent paragraphs of the present description with reference to FIG. 3.

In an embodiment of the present disclosure, the ML-based computing system 104 is configured to receive one or more documents from the one or more electronic devices 102 associated with the one or more users. The ML-based computing system 104 scans the received one or more documents by using the OCR engine 110 for obtaining the mis-captured character image present inside the received one or more documents. The ML-based computing system 104 also determines the primary character and the one or more alternate characters corresponding to the mis-captured character image by using the OCR engine. Further, the ML-based computing system 104 extracts one or more confident instances of each of the primary characters and the one or more alternate characters from the one or more documents by using a character extraction technique. The ML-based computing system 104 generates one or more scores corresponding to each of the primary character and the one or more alternate characters based on a type of the primary character, a type of the one or more alternate characters, the mis-captured character image and the extracted one or more confident instances by using a determined ML model. The ML-based computing system 104 predicts the correct character corresponding to the mis-captured character image from the primary character and the one or more alternate characters by analyzing one or more document parameters, a predefined threshold score, a set of decision strategic rules and the generated one or more scores by using a trained image prediction-based ML model. The ML-based computing system 104 automatically replaces the mis-captured character image with the predicted correct character.

Figure 2:
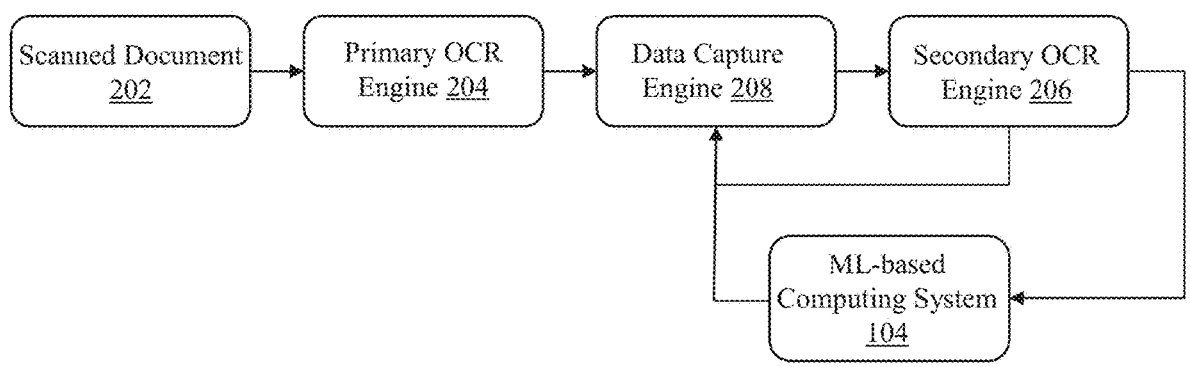
FIG. 2 is a block diagram illustrating an exemplary computing environment for correcting image data, in accordance with another embodiment of the present disclosure.

FIG. 2 is a block diagram illustrating an exemplary computing environment 100 for correcting image data, in accordance with another embodiment of the present disclosure. In an embodiment of the present disclosure, a scanned document 202 is inputted to a primary OCR engine 204. The primary OCR engine 204 attempts to determine text inside the scanned document 202. However, the primary OCR engine 204 fails to determine the text. Further, a secondary OCR engine 206 receives failed cases from data capture engine 208. In an embodiment of the present disclosure, input to the primary OCR engine 204 and the secondary OCR engine 206 is scanned images and output is an Extensible Markup Language (XML) file which includes characters and corresponding coordinates. The data capture engine 208 is a rules engine including a set of rules which runs post data processing by the primary OCR engine 204 to capture the required data fields. The data capture engine 208 captures remittance information from the scanned images of remittance documents that come into the data capture engine 208. In an embodiment of the present disclosure, the data capture engine 208 receives XML as input and identifies invoice numbers, payment amounts and the like, which is used to close a particular open invoice from account receivables data. The failed cases are characters inside the scanned document 202 which are not correctly interpreted by the primary OCR engine 204. Furthermore, the secondary OCR engine 206 also fails to determine correct characters corresponding to the failed cases. The ML-based computing system 104 receives the failed classes and determines a correct character for each of the failed classes by using the trained image prediction-based ML model.

Figure 3:
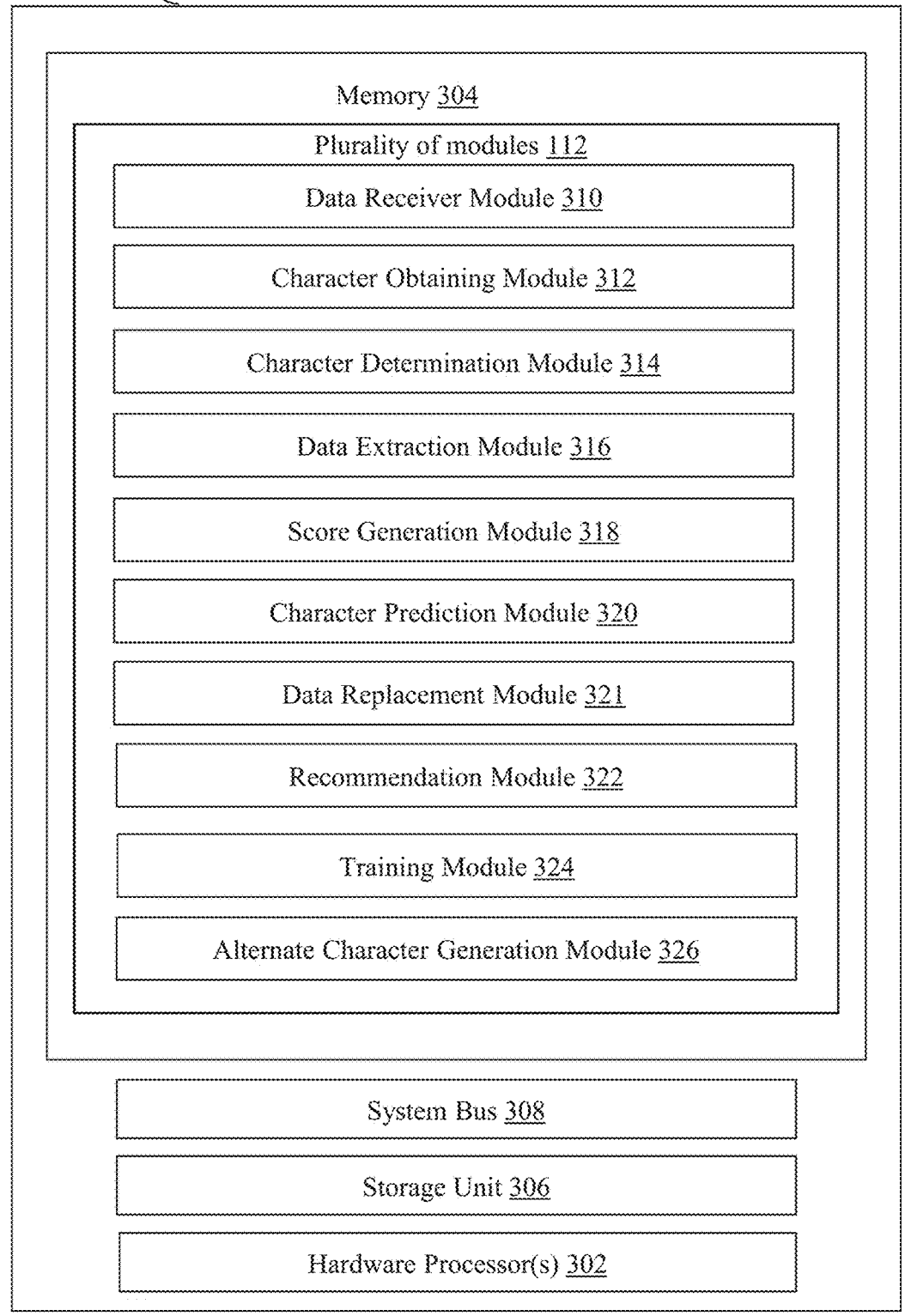
FIG. 3 is a block diagram illustrating an exemplary Machine Learning (ML)-based computing system for correcting image data, in accordance with an embodiment of the present disclosure.

FIG. 3 is a block diagram illustrating an exemplary ML-based computing system 104 for correcting image data, in accordance with an embodiment of the present disclosure. Further, the ML-based computing system 104 includes one or more hardware processors 302, a memory 304 and a storage unit 306. The one or more hardware processors 302, the memory 304 and the storage unit 306 are communicatively coupled through a system bus 308 or any similar mechanism. The memory 304 comprises the plurality of modules 112 in the form of programmable instructions executable by the one or more hardware processors 302. Further, the plurality of modules 112 includes a data receiver module 310, a character obtaining module 312, a character determination module 314, a data extraction module 316, a score generation module 318, a character prediction module 320, a data replacement module 321, a recommendation module 322, a training module 324 and an alternate character generation module 326.

The one or more hardware processors 302, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 302 may also include embedded controllers, such as generic or programmable logic devices or arrays, application specific integrated circuits, single-chip computers, and the like.

The memory 304 may be non-transitory volatile memory and non-volatile memory. The memory 304 may be coupled for communication with the one or more hardware processors 302, such as being a computer-readable storage medium. The one or more hardware processors 302 may execute machine-readable instructions and/or source code stored in the memory 304. A variety of machine-readable instructions may be stored in and accessed from the memory 304. The memory 304 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 304 includes the plurality of modules 112 stored in the form of machine-readable instructions on any of the above-mentioned storage media and may be in communication with and executed by the one or more hardware processors 302.

The storage unit 306 may be a cloud storage, a Structured Query Language (SQL) data store or a location on a file system directly accessible by the plurality of modules 112. The storage unit 306 may store the primary character, the one or more alternate characters, the mis-captured character image, the one or more documents and the correct character. The storage unit 306 may also store the predefined threshold score, the set of decision strategic rules, the one or more scores, the one or more document parameters, a set of character inputs, a probability distribution of corrections, a set of alternate characters and the like.

The data receiver module 310 is configured to receive the one or more documents from the one or more electronic devices associated with the one or more users. In an exemplary embodiment of the present disclosure, the one or more users may include one or more analysts, business analysts, cash analysts, financial analysts and the like. In an exemplary embodiment of the present disclosure, the one or more electronic devices 102 may include a laptop computer, desktop computer, tablet computer, smartphone, wearable device, smart watch and the like. In an embodiment of the present disclosure, the one or more documents may be one or more invoices, one or more remittance documents and the like.

The character obtaining module 312 is configured to scan the received one or more documents by using the OCR engine for obtaining the mis-captured character image present inside the received one or more documents. In an embodiment of the present disclosure, the OCR engine 110 is a technology that recognizes text inside images and scanned documents. In an embodiment of the present disclosure, the mis-captured character image is a character image inside the received one or more documents for which the OCR engine 110 fails to recognize a text or a character while scanning the received one or more documents.

The character determination module 314 is configured to determine the primary character and the one or more alternate characters corresponding to the mis-captured character image by using the OCR engine 110. The primary characters are characters which are predicted by OCR engines to be the best suited candidate for a given part of the image. In an embodiment of the present disclosure, the one or more alternate characters are characters which are predicted by the OCR engines to be the next best suited candidate for a given part of the image. In another embodiment of the present disclosure, the primary character is determined to be the best suited candidate for a subpart of the image while secondary character is the next best candidate crossing a pre-determined threshold. In determining the primary character and the one or more alternate characters corresponding to the mis-captured character image by using the OCR engine 110, the character determination module 314 receives the one or more documents from the one or more users. In an embodiment of the present disclosure, the one or more documents are in one or more formats. For example, the one or more formats include Portable Document Format (PDF), Joint Photographic Expert Group image (JPEG), Portable Network Graphics (PNG), Scalable Vector Graphics (SVG), Web Picture format (WebP) and the like. The character determination module 314 splits the received one or more documents into one or more elements by using the coordinates for the given characters and an OCR-based ML model. In an embodiment of the present disclosure, the OCR-based ML model is a ML model associated with the OCR engine configured to determine the primary character and the one or more alternate characters for each of the characters. In an exemplary embodiment of the present disclosure, the one or more elements include one or more blocks of texts, one or more tables, one or more images and the like. Furthermore, the character determination module 314 splits one or more lines associated with the one or more elements into one or more words by using the OCR-based ML model. The character determination module 314 splits the one or more words into one or more characters by using the OCR-based ML model. Further, the character determination module 314 determines the primary character corresponding to each of the one or more characters by comparing the one or more characters with a set of pattern images by using the OCR-based ML model. In an exemplary embodiment of the present disclosure, the set of pattern images are a set of training images on which the OCR-based ML model is trained. In an embodiment of the present disclosure, the character determination module 314 advances numerous hypotheses corresponding to prediction of a character. Based on these hypotheses, the character determination module 314 analyses different variants of breaking of lines into words and words into characters. After processing a huge number of such probabilistic hypotheses, the character determination module 314 finally takes the decision and determines the character. The character determination module 314 generates a probability threshold of the determined primary character by comparing the one or more characters with the determined primary character by using the OCR-based ML model. If the generated probability threshold of the determined primary character is more than a predefined threshold probability, then the primary character is given as the output. The character determination module 314 classifies the determined primary character into the mis-captured character image if the determined probability threshold of the determined primary character corresponding to each of the one or more characters is below a predefined threshold probability. Furthermore, the character determination module 314 determines the one or more alternate characters corresponding to the determined primary character by using the OCR-based ML model if the determined probability threshold of the determined primary character corresponding to each of the one or more characters is below the predefined threshold probability upon classifying.

The data extraction module 316 is configured to extract the one or more confident instances of each of the primary characters and the one or more alternate characters from the one or more documents by using the character extraction technique. In an embodiment of the present disclosure, the character extraction technique uses top, bottom, left and right coordinates of each of the primary character and the one or more alternate characters or extracting the one or more confident instances. In an embodiment of the present disclosure, the one or more documents are associated with the one or more users or sent by the one or more users in the past. The one or more confident instances are extracted from the one or more documents to increase a localization scope. In increasing the localization scope, it is ensured that the fonts, context, structure, and the like of the document is the same. In an embodiment of the present disclosure, the one or more confident instances are instances of each of the primary characters and the one or more alternate characters in the one or more documents corresponding to which characters are correctly predicted by the OCR engine 110 without error.

The score generation module 318 is configured to generate the one or more scores corresponding to each of the primary character and the one or more alternate characters based on a type of the primary character, a type of the one or more alternate characters, the mis-captured character image and the extracted one or more confident instances by using a determined ML model. In generating the one or more scores corresponding to each of the primary character and the one or more alternate characters based on the type of the primary character, the type of the one or more alternate characters, the mis-captured character image and the extracted one or more confident instances by using the determined ML model, the score generation module 318 detects the type of the primary character based on a predefined character information. In an embodiment of the present disclosure, the type of the primary character is a complex primary character or a general primary character. Further, the score generation module 318 detects the type of each of the one or more alternate characters based on the predefined character information. In an embodiment of the present disclosure, the type of each of the one or more alternate characters is a complex alternate character or a general alternate character. In an embodiment of the present disclosure, the predefined character information is a look-up table including all complex primary characters, all general primary characters, all complex alternate characters, and all general alternate characters. In an exemplary embodiment of the present disclosure, the general primary character and the general alternate character are characters which may be easily distinguished, such as '2' and '1', '4' and 'A', and the like. In an exemplary embodiment of the present disclosure, the complex primary character, and the complex alternate character are characters which may not be easily distinguished, such as '1' and 'I', 'B' and '8', and the like. Furthermore, the score generation module 318 determines a ML model based on the detected type of the primary character and the detected type of each of the one or more alternate characters. In an embodiment of the present disclosure, the ML model is a generic character-based ML model or a complex character-based ML model. The generic character-based ML model is used for the general alternate character and the general primary character. Further, the complex character-based ML model is for the complex alternate character and the complex primary character. The score generation module 318 generates the one or more scores corresponding to each of the primary characters and the one or more alternate characters by comparing the mis-captured character image with the extracted one or more confident instances by using the determined ML model.

The character prediction module 320 is configured to determine the correct character corresponding to the mis-captured character image from the primary character and the one or more alternate characters by analyzing the one or more document parameters, the predefined threshold score, a set of decision strategic rules and the generated one or more scores by using the trained image prediction-based ML model. In an exemplary embodiment of the present disclosure, the one or more document parameters include field of the one or more documents, context, font, document structure, focus area and upper curves of characters in the one or more documents, type of noise, background of the one or more documents, ink quality, and the like. For example, when the field of the one or more documents may be accounts, a set of account strings corresponding to the field of the one or more documents i.e., accounts, are considered while determining the correct character. When the correct character is determined as 'cap1tal', it is re-corrected to 'capital' based on the set of account strings. For example, the set of strings associated with the account field may include capital, account, cash flow, balance sheet, assets and the like. In predicting the correct character corresponding to the mis-captured character image from the primary character and the one or more alternate characters by analyzing the one or more document parameters, the predefined threshold score, the set of decision strategic rules and the generated one or more scores by using the trained image prediction-based ML model, the character prediction module 320 compares the one or more scores of each of the primary character and the one or more alternate characters with the predefined threshold score by using the trained image prediction-based ML model. Further, the character prediction module 320 correlates the result of comparison with the one or more document parameters based on the set of decision strategic rules by using the trained image prediction-based ML model. Furthermore, the character prediction module 320 predicts the correct character corresponding to the mis-captured character image from the primary character and the one or more alternate characters based on the result of correlation. For example, the set of decision strategic rules in case of characters 'B' and '8' include four cases. In case 1, when a primary character (C) i.e., B has 3 or more confident occurrences (RefC) in the one or more documents and an alternate character (A) i.e., '8' has 3 or more confident occurrences (RefA) in the one or more documents, average similarity score of RefC and RefA is calculated, such that the correct character is a character with highest average similarity score. In case, average similarity score of both the characters 'B' and '8' are not above the predefined threshold score and the average similarity score of 'A'— the average similarity score of 'C' is greater than 0.5, the correct character is 'A'. When the average similarity score of 'A'— the average similarity score of 'C' is less than 0.5, the correct character is 'C'. In case 2, when 'C' has RefC in the one or more documents and 'A' doesn't have RefA in the one or more documents, the correct character is 'C' suggested by the OCR engine 110. In case 3, when 'C' doesn't have RefC in the one or more documents and 'A' have RefA in the one or more documents, average similarity score of RefC and RefA is calculated. When the average similarity score of 'A' meets the predefined threshold score, the correct character is 'A'. In case average similarity score of 'A' doesn't meet the predefined threshold score, the correct character is 'C'. In case 4, when 'C' doesn't have RefC in the one or more documents and 'A' doesn't have RefA in the one or more documents, the correct character is 'C' suggested by the OCR engine 110. The set of decision strategic rules are mentioned in the below table:

confident characters from the extracted plurality of characters. In an embodiment of the present disclosure, the set of confident characters are without alternate suggestion. The training module 324 compares the determined set of confident characters with each other based on page number of each of the determined set of confident characters. Furthermore, the training module 324 labels each of the determined set of confident characters based on result of comparison. In an embodiment of the present disclosure, a combination of same characters in the determined set of confident characters are labelled as 1. Further, all characters other than the same characters are labelled as 0. For example, all confident characters may be compared with all confident characters present in same page and may be labelled accordingly. The training module 324 trains the image prediction-based ML model on an image level based on the labelled set of confident characters. In an embodiment of the present disclosure, whole set may be used to the image prediction-based ML model on the image level and the same may be followed for other images as well. For example, remittance pages from different accounts having different fonts are considered for training.

In an embodiment of the present disclosure, the alternate character generation module 326 is configured to receive a

| Example: Case | B C | Other Confident Bs RefC | 8 A | Other Confident 8s RefA | Calculation | Outcome | Failsafe |
|---|---|---|---|---|---|---|---|
| Case 1 | Yes | Yes | Yes | Yes | Take average similarity score of RefC, RefA | Whichever gets higher average similarity score | In cases where we don't have both char averages above the threshold = (if avg alt similarity − avg char similarity) > 0.5, suggest alt, else primary |
| Case 2 | Yes | Yes | Yes | No | — | Primary character suggested by OCR i.e., C | — |
| Case 3 | Yes | No | Yes | Yes | Take average similarity score of RefA matches | A, if average similarity score meets the threshold | In case average of RefA doesn't meet the threshold = primary character prevails i.e., C |
| Case 4 | Yes | No | Yes | No | — | Primary Character Suggested by OCR i.e., C | — |

The data replacement module 321 automatically replaces the mis-captured character image with the predicted correct character.

In an embodiment of the present disclosure, the recommendation module 322 is configured to recommend the one or more users to replace the mis-captured character image with the predicted correct character.

The training module 324 is configured to train an image prediction-based ML model. In training the image prediction-based ML model, the training module 324 receives a set of documents from the external database 108. In an embodiment of the present disclosure, each of the set of documents has a different font size and a different document structure from each other. Further, the training module 324 extracts a plurality of characters from each of the received set of documents. The training module 324 determines a set of set of character inputs from the one or more users to correct the value of one or more OCR characters determined by the OCR engine 110. Further, the alternate character generation module 326 generates a probability distribution of corrections at character level based on the received set of character inputs by using the trained image prediction-based ML model. The alternate character generation module 326 determines a set of alternate characters corresponding to the one or more OCR characters based on the generated probability distribution by using the trained image prediction-based ML model.

Further, operation of the ML-based computing system 104 is explained with the help of a use-case scenario. In a scenario, a data capture engine captures remittance information from scanned images of remittance documents that come into the data capture engine. In an embodiment of the present disclosure, this capture starts with the OCR engine 110 based data extraction followed by a proprietary algorithm to capture invoice details for which the payment is being made. In an embodiment of the present disclosure, the data capture engine is a set of rules which runs post OCR extraction to capture the required data fields. The captured data is then used to close an open Account Retrievable (AR) with the help of the different entities or identifiers present on the remittance documents. In the case of image documents, the success of capture is a function of the quality of the image. Thus, in such cases where the image is distorted, an improper scan from a poor-quality paper is prone to error. The conventional OCR engine 210s fail to remove noises, such as black spaces or garbage values which leads to uncertainties in output. Further, payment is flagged with an AMF exception tag and is manually considered where the analyst manually corrects or edits the incorrectly captured information or identifiers from an exception handling User Interface (UI). In an embodiment of the present disclosure, the AMF exception tag corresponds to a matching entry for a given payment that is not found in open account receivables and hence fail to close the invoice. The ML-based computing system 104 detects and corrects OCR mis-captures and hence helps the analysts save the time spent on manually correcting the OCR mis-captures. In an embodiment of the present disclosure, whenever the data capture engine receives the one or more documents, the data capture engine parses the one or more documents through the OCR engine 110 and predetermined rules are run on it. In an embodiment of the present disclosure, OCR output is an XML file in which character level details are present, such as coordinates. The ML-based computing system 104 determines the primary character and the one or more alternate characters for the mis-captured character image i.e., a character on which it is not very confident by using the OCR engine 110. Further, the ML-based computing system 104 extracts the one or more confident instances of each of the primary characters and the one or more alternate characters from the one or more documents by using the character extraction technique. In an embodiment of the present disclosure, the character extraction technique uses top, bottom, left and right coordinates of each of the primary character and the one or more alternate characters or extracting the one or more confident instances. The ML-based computing system 104 generates the one or more scores corresponding to each of the primary character and the one or more alternate characters based on the type of the primary character, the type of the one or more alternate characters, the mis-captured character image and the extracted one or more confident instances by using the determined ML model. The ML-based computing system 104 predicts the correct character corresponding to the mis-captured character image from the primary character and the one or more alternate characters by analyzing one or more document parameters, the predefined threshold score, the set of decision strategic rules and the generated one or more scores by using the trained image prediction-based ML model. The ML-based computing system 104 recommends the one or more users to replace the mis-captured character image with the predicted correct character.

FIG. 4A is an exemplary document 402 depicting creation of training data for the image prediction-based ML model, in accordance with an embodiment of the present disclosure. In an embodiment of the present disclosure, the plurality of characters are extracted from the document 402 for creation of a training or inference data. In the current scenario, '0', '9', '/', '0', '2', and the like are characters which are extracted from the document 402.

Figure 4B:
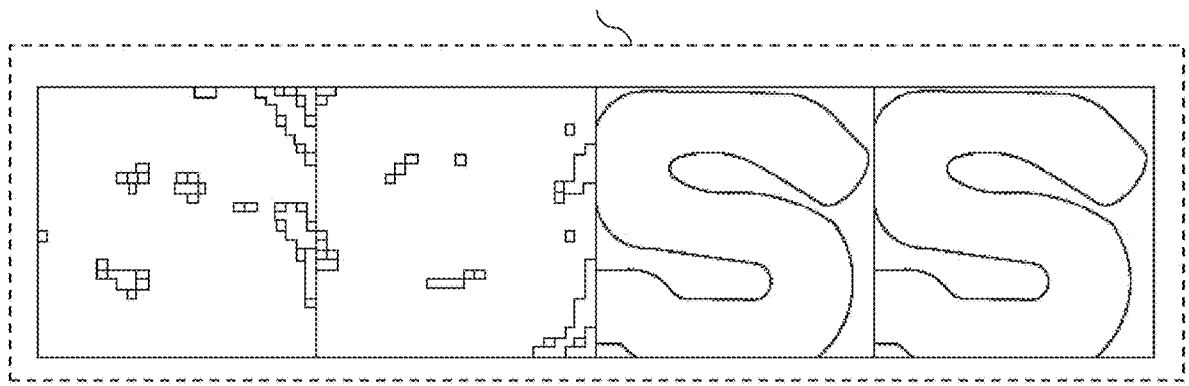
FIG. 4B is an exemplary pictorial depiction of a set of learned patterns for training the image prediction-based ML model, in accordance with an embodiment of the present disclosure.
Figure 4B:
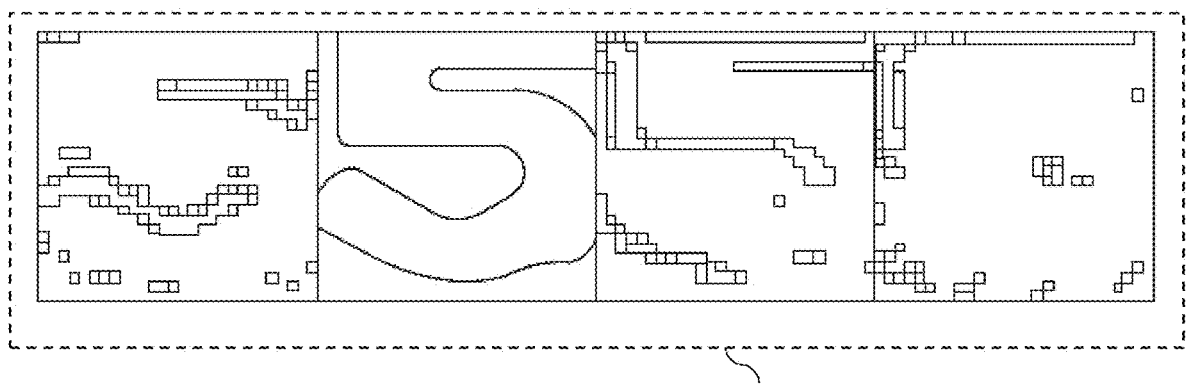

FIG. 4B is an exemplary pictorial depiction of a set of learned patterns for training the image prediction-based ML model, in accordance with an embodiment of the present disclosure. In an embodiment of the present disclosure, 404 represent a set of learned patterns for character 'S' and 406 represent a set of learned patterns for character '5'. The set of learned patterns 404, 406 trains the image prediction-based ML model, such that the trained image prediction-based ML model may distinguish between 'S' and '5'.

Figure 5A:
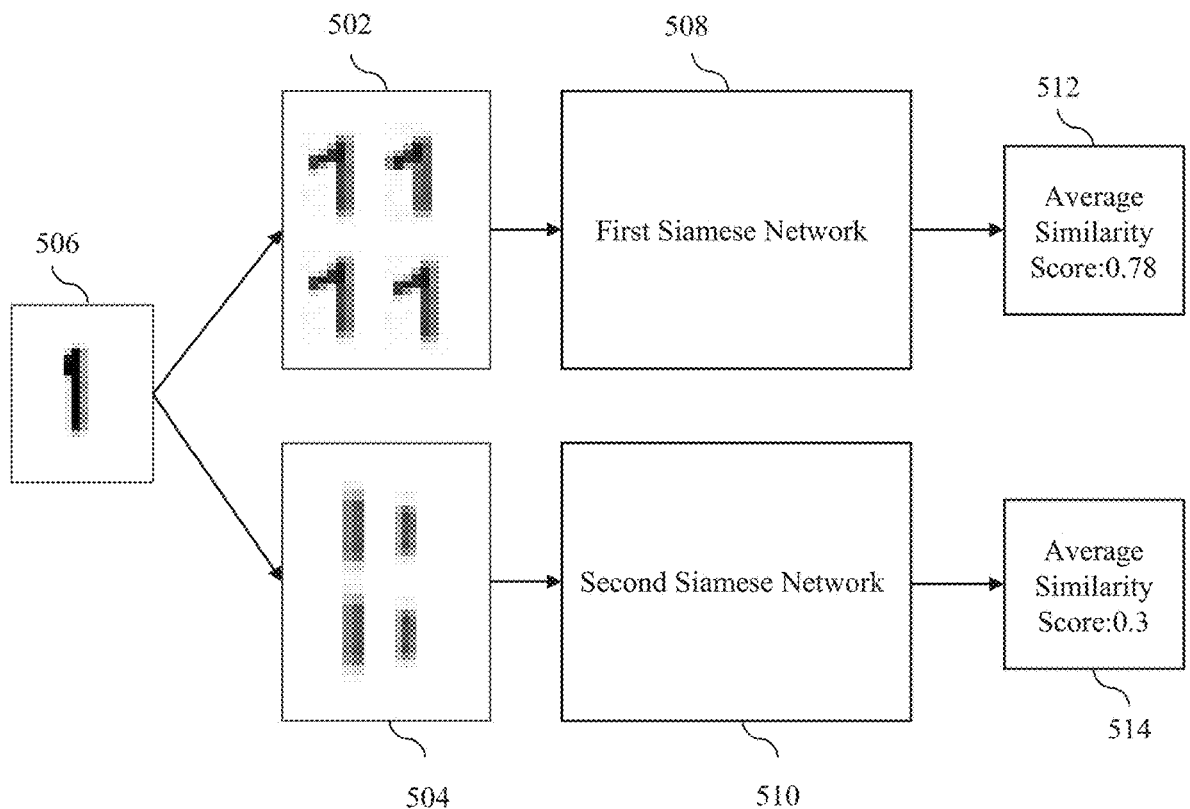
FIG. 5A is a block diagram illustrating generation of one or more scores corresponding to each of a primary character and one or more alternate characters, in accordance with an embodiment of the present disclosure.

FIG. 5A is a block diagram illustrating generation of the one or more scores corresponding to each of the primary character and the one or more alternate characters, in accordance with an embodiment of the present disclosure. In an embodiment of the present disclosure, the one or more confident instances 502 of the primary character and the one or more confident instances 504 of the one or more alternate characters are extracted from the one or more documents by using the character extraction technique. For example, the primary character is '1' and the one or more alternate character is T. In an embodiment of the present disclosure, the primary character and the one or more alternate characters correspond to the mis-captured character image 506. Further, the determined ML model generates the one or more scores corresponding to each of the primary characters and the one or more alternate characters based on the extracted one or more confident instances 502, 504. In an embodiment of the present disclosure, the determined ML model corresponds to a first Siamese network 508 and a second Siamese network 510. In an embodiment of the present disclosure, Siamese networks are generally used for tackling the problem of face recognition using only one sample at a prediction time. In the current scenario, the Siamese networks learn features from a large set of images which may be useful at prediction time. In an embodiment of the present disclosure, the first Siamese network 508 generates average similarity score 512 of 0.78 corresponding to the primary character and the second Siamese network 510 generates average similarity score 514 of corresponding to the one or more alternate characters. Since the average similarity score 512 of the primary character is more than the average similarity score 514 of the one or more alternate characters, the correct character corresponding to the mis-captured character image is the primary character.

Figure 5B:
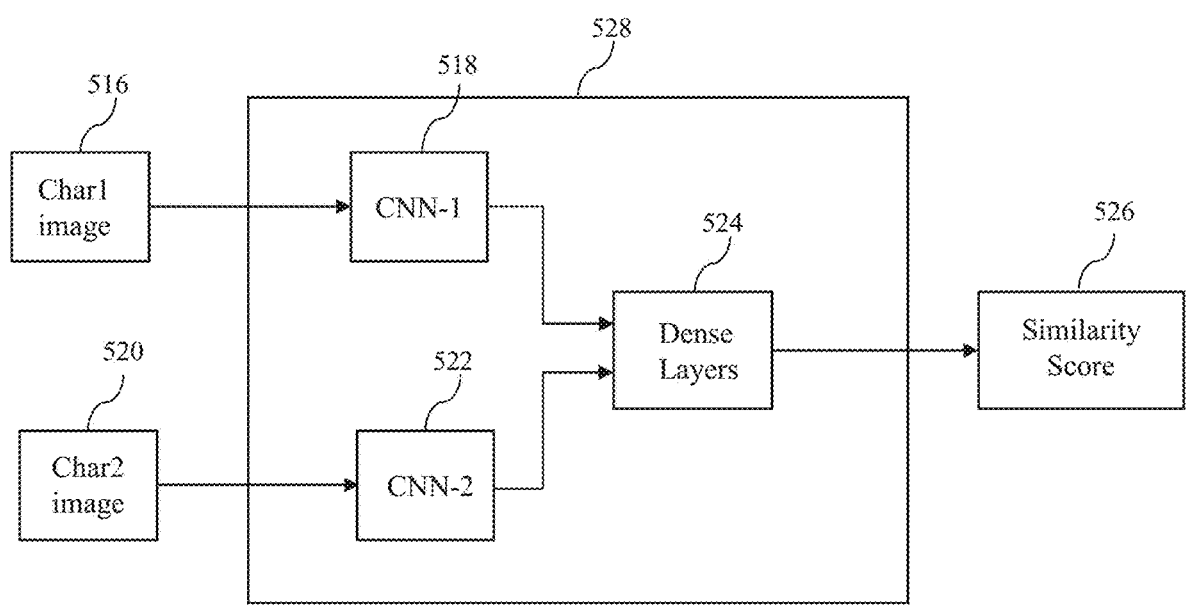
FIG. 5B is a block diagram illustrating generation of the one or more scores corresponding to each of the primary character and the one or more alternate characters, in accordance with another embodiment of the present disclosure.

FIG. 5B is a block diagram illustrating generation of the one or more scores corresponding to each of the primary character and the one or more alternate characters, in accordance with another embodiment of the present disclosure. In an embodiment of the present disclosure, a first character image 516 is inputted to a first Convolutional Neural Network (CNN) model 518 and a second character image 520 is inputted to a second CNN model 522. Further, the first CNN model 518 generates a vectorized form of the first character image 516 and the second CNN model 522 generates a vectorized form of the second character image 520. Furthermore, the vectorized form of the first character image 516 and the vectorized form of the second character image 520 are inputted to dense layers 524 to generate a similarity score 526 for each of the first character image 516 and the second character image 520. In an embodiment of the present disclosure, the first CNN model 518, the second CNN model 522 and the dense layers 524 collectively forms the determined ML model 528. The dense layers 524 is a neural network.

Figure 5C:
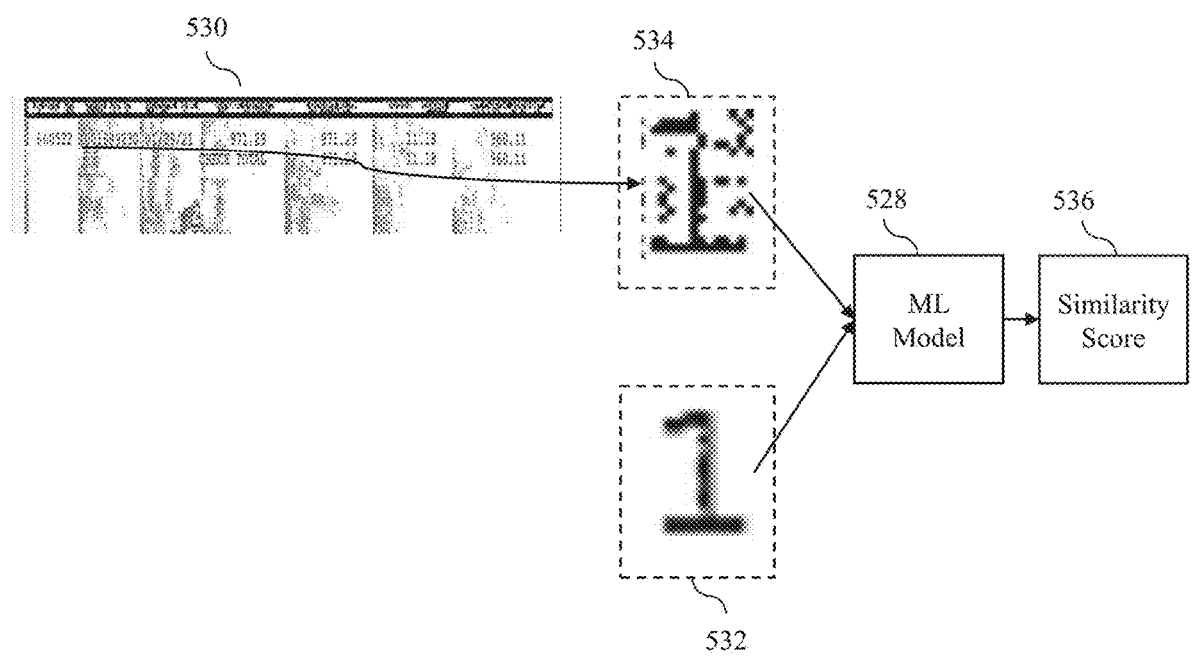
FIG. 5C is a schematic representation illustrating generation of the one or more scores corresponding to each of the primary character and the one or more alternate characters, in accordance with an embodiment of the present disclosure.

FIG. 5C is a schematic representation illustrating generation of the one or more scores corresponding to each of the primary character and the one or more alternate characters, in accordance with an embodiment of the present disclosure. In an embodiment of the present disclosure, the OCR engine 110 receives an input document 530 from the one or more users and determines an alternative character 532 corresponding to a mis-captured character 534 inside the received input document 530. In the current scenario, the character "1" in a second column got captured as "2" by the OCR engine 110 along with an alternate suggestion of "1". In an embodiment of the present disclosure, the mis-captured character 534 is cropped along with instances of suggested character from the same page using the coordinates. Further, the determined ML model 528 determines a similarity score 536 corresponding to each of the mis-captured character 534 and the alternative character 532. In an embodiment of the present disclosure, alternate suggestions i.e., the mis-captured character 534 and the alternative character 532, whichever gets the maximum similarity score may be considered as a most probable replacement for the mis-captured character 534.

Figure 6:
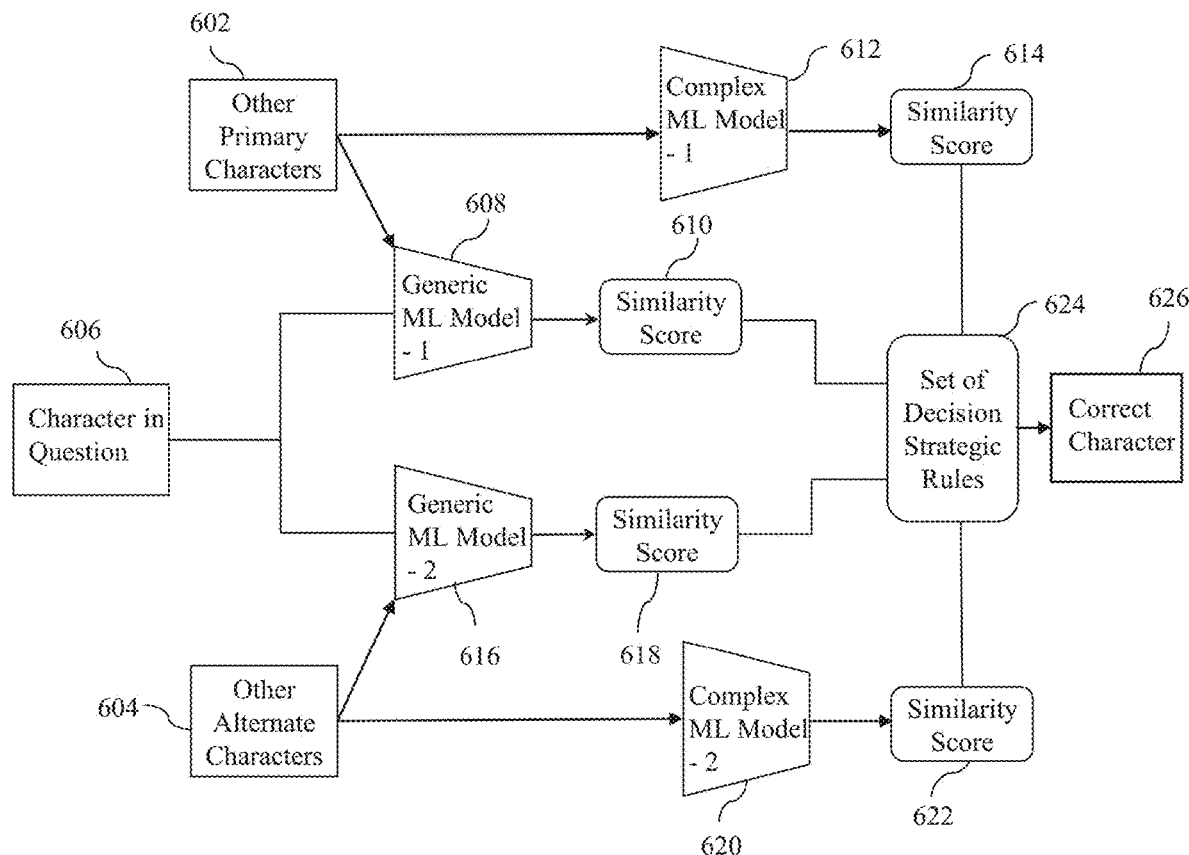
FIG. 6 is a block diagram illustrating an exemplary operation of the ML-based computing system for correcting image data, in accordance with an embodiment of the present disclosure.

FIG. 6 is a block diagram illustrating an exemplary operation of the ML-based computing system 104 for correcting image data, in accordance with an embodiment of the present disclosure. In an embodiment of the present disclosure, the ML-based computing system 104 determines other primary characters 602 and other alternate characters 604 corresponding to a character in question 606 by using the OCR engine 110. In an embodiment of the present disclosure, the character in question 606 is the mis-captured character image which is required to be predicted, such as 'B'. In an embodiment of the present disclosure, the other primary characters 602 are other confident occurrences of the character in question 606. The other alternate characters are other confident occurrences of character which might be a replacement, such as '8'. When the other primary characters 602 are generic primary characters and not a part of complex character set, a first generic character-based ML model 608 generates a similarity score 610 corresponding to the other primary characters 602. For example, the complex character set includes 'O', '0', 'c', 'e', '1', 'I' and the like. When the other primary characters 602 are part of the complex character set, a first complex character-based ML model 612 generates a similarity score 614 corresponding to the other primary characters 602. Further, when other alternate characters 604 are generic and not the part of complex character set, a second generic character-based ML model 616 generates a similarity score 618 corresponding to the other alternate characters 602. When the other alternate characters 604 are part of the complex character set, a second complex character-based ML model 620 generates a similarity score 622 corresponding to the other alternate characters 604. Furthermore, the set of decision strategic rules 624 are applied on the similarity scores 610, 614, 618 and 622 to predict the correct character 626 corresponding to the character in question 606. The first generic character-based ML model 608 and the second generic character-based ML model 616 are models trained on all possible combinations of character pairs to learn generic similarity scores. Further, the first complex character-based ML model 612 and the second complex character-based ML model 620 are models trained on possible combinations of characters on which the first generic character-based ML model 608 and the second generic character-based ML model 616 fail i.e., low precision. In an embodiment of the present disclosure, the set of decision strategic rules 624 decide whether replacement is required or not.

Figure 7:
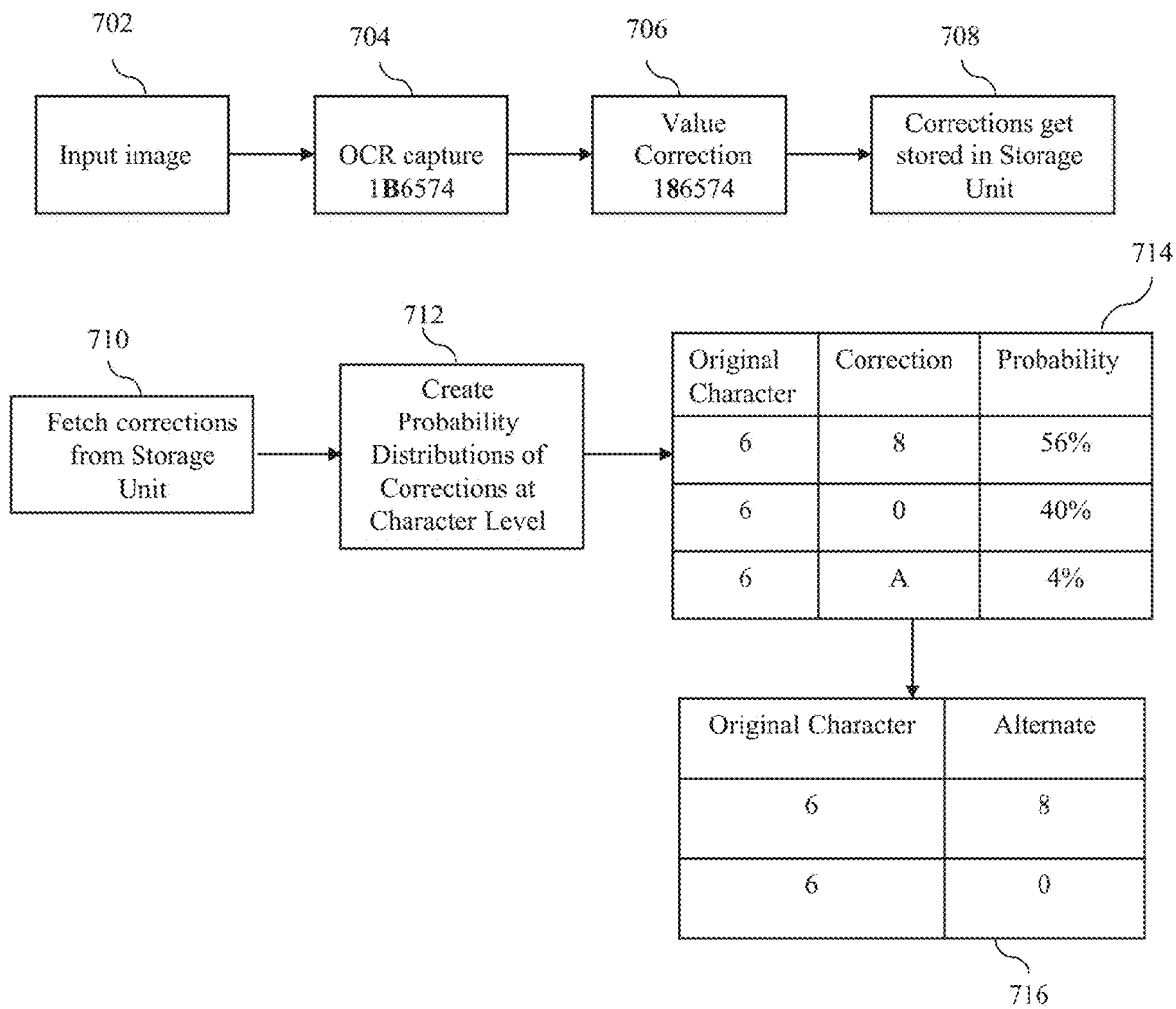
FIG. 7 is an exemplary block diagram illustrating generation of alternate characters, in accordance with another embodiment of the present disclosure.

FIG. 7 is an exemplary block diagram illustrating generation of alternate characters, in accordance with another embodiment of the present disclosure. In an embodiment of the present disclosure, the OCR engine 110 receives an input image 702 and captures a set of characters i.e., 1B6574 at step 704. Further, character 'B' is corrected to character '8' by the one or more users at step 706. The correction is stored in the storage unit 306 at 708. Furthermore, at step 710, the corrections are fetched from the storage unit 306. At step 712, a probability distribution 714 of corrections is created at character level. Further, at step 716, a set of alternates are generated corresponding to each of the set of characters.

Figure 8A:
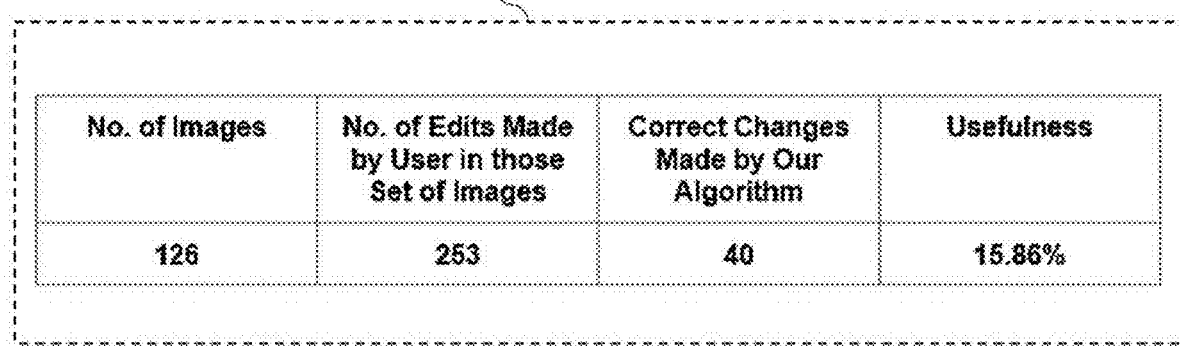
FIG. 8A is an exemplary table illustrating experiment results of the ML-based computing system, in accordance with an embodiment of the present disclosure.

FIG. 8A is an exemplary table 802 illustrating experiment results of the ML-based computing system 104, in accordance with an embodiment of the present disclosure. In an embodiment of the present disclosure, the exemplary table 802 discloses the number of images, number of edits, correct changes and usefulness corresponding to the ML-based computing system 104.

FIG. 8B is an exemplary table 804 illustrating experiment results of the ML-based computing system 104, in accordance with another embodiment of the present disclosure. In an embodiment of the present disclosure, the exemplary table 804 discloses the number of words validated, true positives, false positives and non-deterministic corresponding to the ML-based computing system 104.

Figure 9:
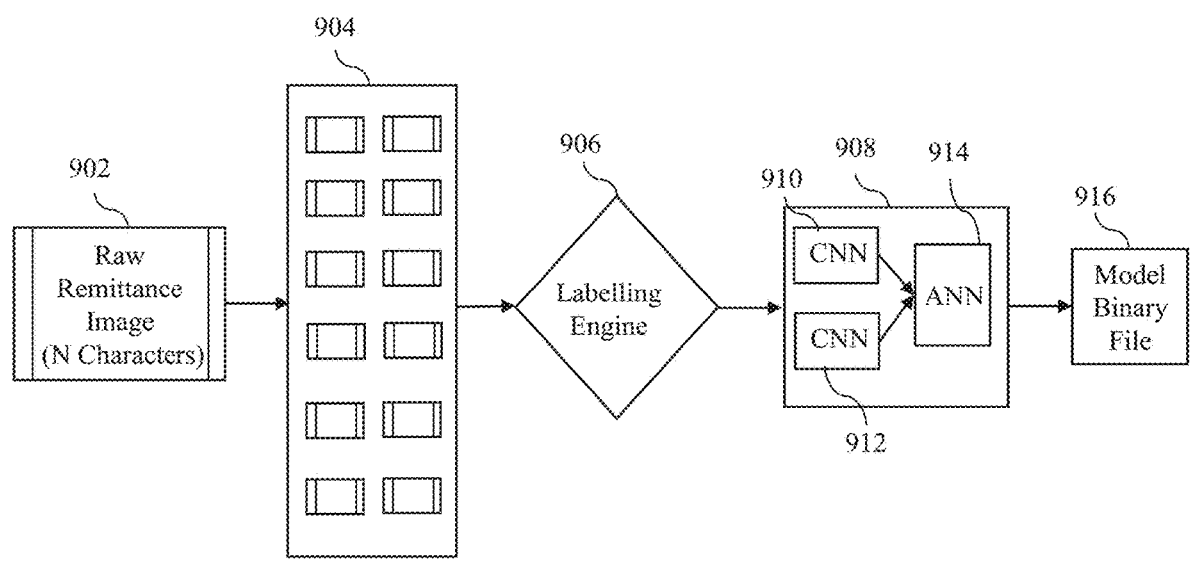
FIG. 9 is a block diagram illustrating training of the image prediction-based ML model, in accordance with an embodiment of the present disclosure.

FIG. 9 is a block diagram illustrating training of the image prediction-based ML model, in accordance with an embodiment of the present disclosure. In an embodiment of the present disclosure, 902 represents one or more ways in which the remittance document may be received. Each remittance document may include 'N' number of characters. Further, 904 represents that each character is paired with other characters for the same document. Furthermore, a labeling engine 906 labels each pair (as shown in 904) as 1 if both the pairs belong to the same character else 0. Furthermore, a Siamese network 908 includes two Convolutional Neural Networks (CNNs) 910, 912 connecting to a fully connected Artificial Neural Network (ANN) 914 i.e., a dense network. Further, a final model binary file 916 contains a neural network architecture and the weights. The model binary file 916 is used at the time of prediction.

Figure 10:
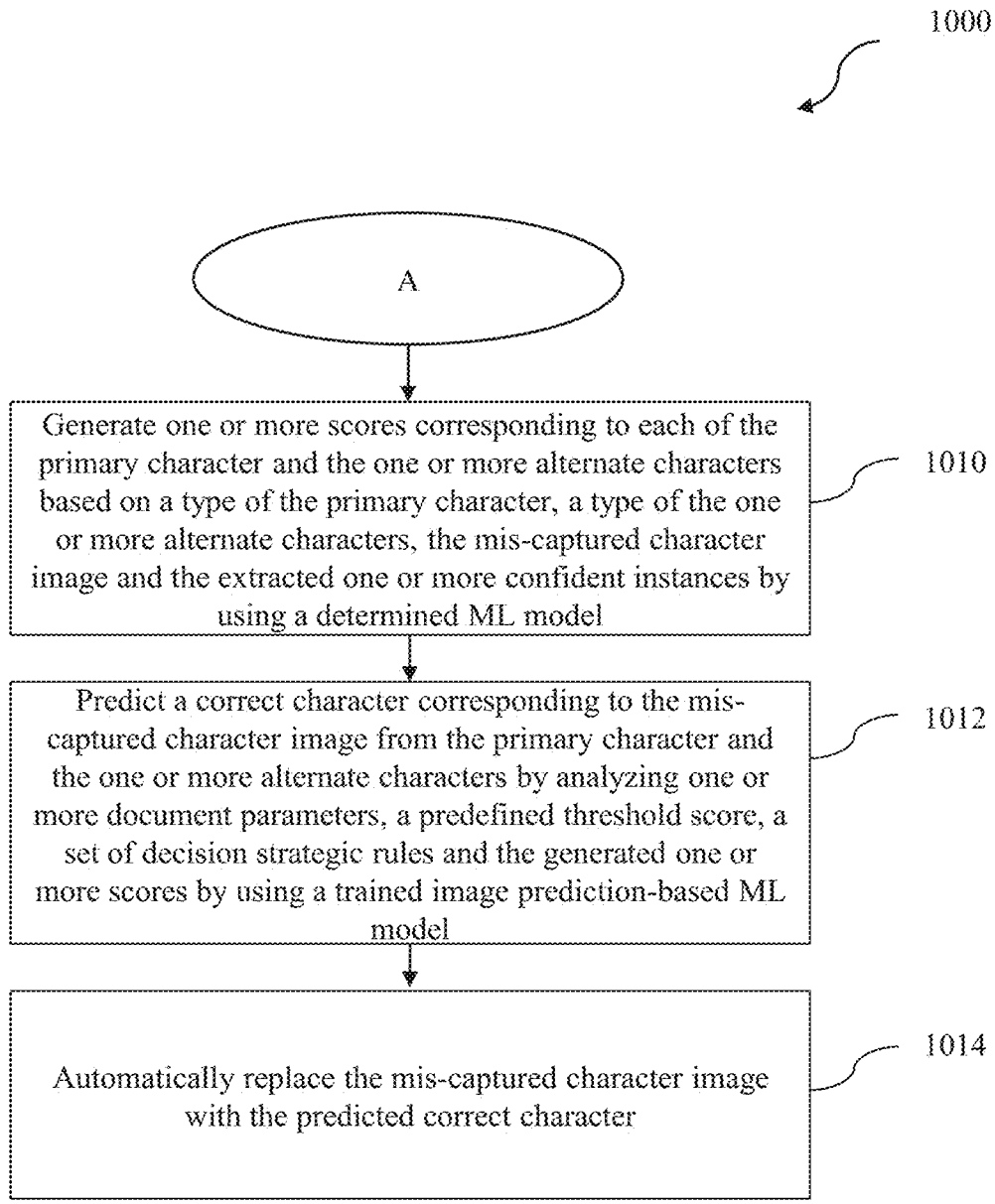
FIG. 10 is a process flow diagram illustrating an exemplary ML-based method for correcting image data, in accordance with an embodiment of the present disclosure.

FIG. 10 is a process flow diagram illustrating an exemplary ML-based method 1000 for correcting image data, in accordance with an embodiment of the present disclosure. At step 1002, one or more documents are received from one or more electronic devices associated with one or more users. In an exemplary embodiment of the present disclosure, the one or more users may include one or more analysts, business analysts, cash analysts, financial analysts and the like. In an exemplary embodiment of the present disclosure, the one or more electronic devices 102 may include a laptop computer, desktop computer, tablet computer, smartphone, wearable device, smart watch and the like. In an embodiment of the present disclosure, the one or more documents may be one or more invoices, one or more remittance documents and the like.

At step 1004, the received one or more documents are scanned by using an OCR engine for obtaining a mis-captured character image present inside the received one or more documents. In an embodiment of the present disclosure, the OCR engine 110 is a technology that recognizes text inside images and scanned documents. In an embodiment of the present disclosure, the mis-captured character image is a character image inside the received one or more documents for which the OCR engine 110 fails to recognize a text or a character while scanning the received one or more documents At step 1006, a primary character and one or more alternate characters corresponding to the mis-captured character image are determined by using the OCR engine 110. The primary characters are characters which are predicted by OCR engines to be the best suited candidate for a given part of the image. In an embodiment of the present disclosure, the one or more alternate characters are characters which are predicted by the OCR engines to be the next best suited candidate for a given part of the image. In determining the primary character and the one or more alternate characters corresponding to the mis-captured character image, the ML-based method 1000 includes receiving the one or more documents from one or more users. In an embodiment of the present disclosure, the one or more documents are in one or more formats. For example, the one or more formats include Portable Document Format (PDF), Joint Photographic Expert Group image (JPEG), Portable Network Graphics (PNG), Scalable Vector Graphics (SVG), Web Picture format (WebP) and the like. The ML-based method 1000 includes splitting the received one or more documents into one or more elements by using the coordinates for the given characters and an OCR-based ML model. In an embodiment of the present disclosure, the OCR-based ML model is a ML model associated with the OCR engine configured to determine the primary character and the one or more alternate characters for each of the characters. In an exemplary embodiment of the present disclosure, the one or more elements include one or more blocks of texts, one or more tables, one or more images and the like. Furthermore, the ML-based method 1000 includes splitting one or more lines associated with the one or more elements into one or more words by using the OCR-based ML model. The ML-based method 1000 includes splitting the one or more words into one or more characters by using the OCR-based ML model. Further, the ML-based method 1000 includes determining the primary character corresponding to each of the one or more characters by comparing the one or more characters with a set of pattern images by using the OCR-based ML model. In an exemplary embodiment of the present disclosure, the set of pattern images are a set of training images on which the OCR-based ML model is trained. In an embodiment of the present disclosure, the ML-based method 1000 includes advancing numerous hypotheses corresponding to prediction of a character. Based on these hypotheses, the different variants of breaking of lines into words and words into characters are analyzed. After processing a huge number of such probabilistic hypotheses, the final decision is taken to determine the character. The ML-based method 1000 includes generating a probability threshold of the determined primary character by comparing the one or more characters with the determined primary character by using the OCR-based ML model. If the generated probability threshold of the determined primary character is more than a predefined threshold probability, then the primary character is given as the output. The ML-based method 1000 includes classifying the determined primary character into the mis-captured character image if the determined probability threshold of the determined primary character corresponding to each of the one or more characters is below a predefined threshold probability. Furthermore, the ML-based method 1000 includes determining the one or more alternate characters corresponding to the determined primary character by using the OCR-based ML model if the determined probability threshold of the determined primary character corresponding to each of the one or more characters is below the predefined threshold probability. In an embodiment of the present disclosure, the primary character corresponds to the mis-captured character image.

At step 1008, one or more confident instances of each of the primary characters and the one or more alternate characters from the one or more documents by using the character extraction technique. In an embodiment of the present disclosure, the one or more documents are associated with the one or more users or sent by the one or more users in past. The one or more confident instances are extracted from the one or more documents to increase a localization scope. In an embodiment of the present disclosure, the one or more confident instances are instances of each of the primary characters and the one or more alternate characters in the one or more documents corresponding to which characters are correctly predicted by the OCR engine 110 without error.

At step 1010, one or more scores corresponding to each of the primary character and the one or more alternate characters are generated based on a type of the primary character, a type of the one or more alternate characters, the mis-captured character image, and the extracted one or more confident instances by using a determined ML model. In generating the one or more scores corresponding to each of the primary character and the one or more alternate characters based on the type of the primary character, the type of the one or more alternate characters, the mis-captured character image and the extracted one or more confident instances by using the determined ML model, the ML-based method 1000 includes detecting the type of the primary character based on a predefined character information. In an embodiment of the present disclosure, the type of the primary character is a complex primary character or a general primary character. Further, the ML-based method 1000 includes detecting the type of each of the one or more alternate characters based on the predefined character information. In an embodiment of the present disclosure, the type of each of the one or more alternate characters is a complex alternate character or a general alternate character. In an embodiment of the present disclosure, the predefined character information is a look-up table including all complex primary characters, all general primary characters, all complex alternate characters, and all general alternate characters. In an exemplary embodiment of the present disclosure, the general primary character and the general alternate character are characters which may be easily distinguished, such as '2' and '1', '4' and 'A', and the like. In an exemplary embodiment of the present disclosure, the complex primary character, and the complex alternate character are characters which may not be easily distinguished, such as '1' and 'I', 'B' and '8', and the like. Furthermore, the ML-based method 1000 includes determining a ML model based on the detected type of the primary character and the detected type of each of the one or more alternate characters. In an embodiment of the present disclosure, the ML model is a generic character-based ML model or a complex character-based ML model.

The generic character-based ML model is used for the general alternate character and the general primary character. Further, the complex character-based ML model is for the complex alternate character and the complex primary character. The ML-based method 1000 includes generating the one or more scores corresponding to each of the primary characters and the one or more alternate characters by comparing the mis-captured character image with the extracted one or more confident instances by using the determined ML model.

At step 1012, correct character corresponding to the mis-captured character image is predicted from the primary character and the one or more alternate characters by analyzing the one or more document parameters, a predefined threshold score, a set of decision strategic rules and the generated one or more scores by using a trained image prediction-based ML model. In an exemplary embodiment of the present disclosure, the one or more document parameters include field of the one or more documents, context, font, document structure, focus area and upper curves of characters in the one or more documents, type of noise, background of the one or more documents, ink quality and the like. For example, when the field of the one or more documents may be accounts, a set of account strings corresponding to the field of the one or more documents i.e., accounts, are considered while determining the correct character. When the correct character is determined as 'capital', it is re-corrected to 'capital' based on the set of account strings. For example, the set of strings associated with the account field may include capital, account, cash flow, balance sheet, assets and the like. In predicting the correct character corresponding to the mis-captured character image from the primary character and the one or more alternate characters by analyzing the one or more document parameters, the predefined threshold score, the set of decision strategic rules and the generated one or more scores by using the trained image prediction-based ML model, the ML-based method 1000 includes comparing the one or more character corresponding to the mis-captured character image from the primary character and the one or more alternate characters based on the result of correlation. For example, the set of decision strategic rules in case of characters 'B' and '8' include four cases. In case 1, when a primary character (C) i.e., B has 3 or more confident occurrences (RefC) in the one or more documents and an alternate character (A) i.e., '8' has 3 or more confident occurrences (RefA) in the one or more documents, average similarity score of RefC and RefA is calculated, such that the correct character is a character with highest average similarity score. In case, the average similarity score of both the characters 'B' and '8' are not above the predefined threshold score and the average similarity score of 'A'— the average similarity score of 'C' is greater than 0.5, the correct character is 'A'. When the average similarity score of 'A'— the average similarity score of 'C' is less than 0.5, the correct character is 'C'. In case 2, when 'C' has RefC in the one or more documents and 'A' doesn't have RefA in the one or more documents, the correct character is 'C' suggested by the OCR engine 110. In case 3, when 'C' doesn't have RefC in the one or more documents and 'A' have RefA in the one or more documents, average similarity score of RefC and RefA is calculated. When the average similarity score of 'A' meets the predefined threshold score, the correct character is 'A'. In case average similarity score of 'A' doesn't meet the predefined threshold score, the correct character is 'C'. In case 4, when 'C' doesn't have RefC in the one or more documents and 'A' doesn't have RefA in the one or more documents, the correct character is 'C' suggested by the OCR engine 110. The set of decision strategic rules are mentioned in the below table:

| Example: Case | B C | Other Confident Bs RefC | 8 A | Other Confident 8s RefA | Calculation | Outcome | Failsafe |
|---|---|---|---|---|---|---|---|
| Case 1 | Yes | Yes | Yes | Yes | Take average similarity score of RefC, RefA | Whichever gets higher average similarity score | In cases where we don't have both char averages above the threshold = (if avg alt similarity − avg char similarity) > 0.5, suggest alt, else primary |
| Case 2 | Yes | Yes | Yes | No | — | Primary character suggested by OCR i.e., C | — |
| Case 3 | Yes | No | Yes | Yes | Take average similarity score of RefA matches | A, if average similarity score meets the threshold | In case average of RefA doesn't meet the threshold = primary character prevails i.e., C |
| Case 4 | Yes | No | Yes | No | — | Primary Character Suggested by OCR i.e., C | — | scores of each of the primary character and the one or more alternate characters with the predefined threshold score by using the trained image prediction-based ML model. Further, the ML-based method 1000 includes correlating the result of comparison with the one or more document parameters based on the set of decision strategic rules by using the trained image prediction-based ML model. Furthermore, the ML-based method 1000 includes predicting the correct At step 1014, the mis-captured character image is automatically replaced with the predicted correct character.

In an embodiment of the present disclosure, the ML-based method 1000 includes recommending the one or more users to replace the mis-captured character image with the predicted correct character.

Further, the ML-based method 1000 includes training an image prediction-based ML model. In training the image prediction-based ML model, the ML-based method 1000 includes receiving a set of documents from an external database 108. In an embodiment of the present disclosure, each of the set of documents has a different font size and a different document structure from each other. Further, the ML-based method 1000 includes extracting a plurality of characters from each of the received set of documents. The ML-based method 1000 includes determining a set of confident characters from the extracted plurality of characters. In an embodiment of the present disclosure, the set of confident characters are without alternate suggestion. The ML-based method 1000 includes comparing the determined set of confident characters with each other based on page number of each of the determined set of confident characters. Furthermore, the ML-based method 1000 includes labeling each of the determined sets of confident characters based on the result of comparison. In an embodiment of the present disclosure, a combination of same characters in the determined set of confident characters are labelled as 1. Further, all characters other than the same characters are labelled as 0. For example, all confident characters may be compared with all confident characters present in the same page and may be labelled accordingly. The ML-based method 1000 includes training the image prediction-based ML model on an image level based on the labelled set of confident characters. In an embodiment of the present disclosure, the whole set may be used to the image prediction-based ML model on the image level and the same may be followed for other images as well. For example, remittance pages from different accounts having different fonts are considered for training.

In an embodiment of the present disclosure, the ML-based method 1000 includes receiving a set of character inputs from the one or more users to correct the value of one or more OCR characters determined by the OCR engine 110. Further, the ML-based method 1000 includes generating a probability distribution of corrections at character level based on the received set of character inputs by using the trained image prediction-based ML model. The ML-based method 1000 includes determining a set of alternate characters corresponding to the one or more OCR characters based on the generated probability distribution by using the trained image prediction-based ML model.

The method 1000 may be implemented in any suitable hardware, software, firmware, or combination thereof.

Thus, various embodiments of the present ML-based computing system 104 provide a solution to process data in the one or more documents. In an embodiment of the present disclosure, the ML-based computing system 104 is localized at a document level i.e., font, document structure, type of noise, background, ink quality and the like are taken into consideration by default. Further, the ML-based computing system 104 learns patterns at a font level. The ML-based computing system 104 performs one shot learning which doesn't require a specific target model for each character pair. Furthermore, the ML-based computing system 104 removes noise by data augmentation. The ML-based computing system 104 learns from user inputs in the form of corrections to provide alternate characters. The ML-based computing system 104 trains and builds a ML model that can output a similarity score between the two characters. In an embodiment of the present disclosure, XML of an image is parsed, and all characters suggested by the OCR are considered by the ML-based computing system 104 to determine the correct character. For example, when the primary character is '1' and alternate character is '7', the ML-based computing system 104 determines if '1' is more suitable for a placeholder or '7'. The ML-based computing system 104 includes a learning mechanism, such that a probability map may be created based on the user's actions in the past. For example, when there are 100 captures of number 6, out of those 50 were correct, 30 were corrected to 8 and 20 were corrected to 0. Thus, alternate character map for 6 may include 8 & 0 with 0.3, 0.2 probabilities correspondingly. In an embodiment of the present disclosure, the OCR engine 110 may have access to only a single document at a time. However, the ML-based computing system 104 may consider multiple documents shared by the same customer in the past and hence increasing the localization scope. Furthermore, the ML-based computing system 104 may deal with the one or more documents received in a cash application and based on the received one or more documents it may be determined if a correction is required or not based on the type of field of a particular string. For example, in an amount field there is no place for a character irrespective of any associated similarity.

In an embodiment of the present disclosure, the process of capturing information from remittances or scanned images to match with payments is a core functionality of data capture engine. This entails OCR based data extraction followed by a proprietary algorithm to capture the invoice details. The objective of the ML-based computing system 104 is to correct the OCR mis-captures in case of wrong extraction of similar looking characters, such as 'O' in place of '0', '5' in place of 'S' and the like with the help of a machine learning model. In case of a lower quality image being wrongly extracted, the subsequent capture may result in an error and thereby reducing data capture rate. Since the OCR engine 110 can't auto correct these cases, an analyst is required to manually correct or edit the incorrectly captured information or identifiers from the exception handling user interface screen. The ML-based computing system 104 helps in reducing time and effort spent by analysts and, also improves the data capture rates. In an embodiment of the present disclosure, the ML model is localized at a document level, such as font, document structure, type of noise, background, ink quality and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 308 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A Machine Learning (ML)-based computing system for correcting image data, the ML-based computing system comprising: one or more hardware processors; and
   a memory coupled to the one or more hardware processors, wherein the memory comprises a plurality of modules in the form of programmable instructions executable by the one or more hardware processors, and wherein the plurality of modules comprises: a data receiver module configured to receive one or more documents from one or more electronic devices associated with one or more users;
   a character obtaining module configured to scan the received one or more documents by using an Optical Character Recognition (OCR) engine for obtaining a mis-captured character image present inside the received one or more documents;
   a character determination module configured to determine a primary character and one or more alternate characters corresponding to the mis-captured character image by using the OCR engine;
   a data extraction module configured to extract one or more instances of each of the primary character and the one or more alternate characters from the one or more documents by using a character extraction technique;
   a score generation module configured to generate one or more scores corresponding to each of the primary character and the one or more alternate characters based on a type of the primary character, a type of the one or more alternate characters, the mis-captured character image and the extracted one or more instances by using a determined ML model;
   a character prediction module configured to predict a correct character corresponding to the mis-captured character image from the primary character and the one or more alternate characters by analyzing one or more document parameters, a predefined threshold score, a set of decision strategic rules and the generated one or more scores by using a trained image prediction-based ML model, wherein the one or more document parameters comprise a field of the one or more documents including, context, font, document structure, focus area and upper curves of characters in the one or more documents, type of noise, background of the one or more documents, and ink quality; and
   a data replacement module configured to automatically replace the mis-captured character image with the predicted correct character.

2. The ML-based computing system of claim 1, wherein in determining the primary character and the one or more alternate characters corresponding to the mis-captured character image by using the OCR engine, the character determination module is configured to:
   receive the one or more documents from the one or more users, wherein the one or more documents are in one or more formats;
   split the received one or more documents into one or more elements by using coordinates for given characters and an OCR-based ML model;
   split one or more lines associated with the one or more elements into one or more words by using the OCR-based ML model;
   split the one or more words into one or more characters by using the OCR-based ML model;
   determine the primary character corresponding to each of the one or more characters by comparing the one or more characters with a set of pattern images by using the OCR-based ML model;
   generate a probability threshold of the determined primary character by comparing the one or more characters with the determined primary character by using the OCR-based ML model;
   classify the determined primary character into the mis-captured character image if the determined probability threshold of the determined primary character corresponding to each of the one or more characters is below a predefined threshold probability; and
   determine the one or more alternate characters corresponding to the determined primary character by using the OCR-based ML model if the determined probability threshold of the determined primary character corresponding to each of the one or more characters is below a predefined threshold probability upon classifying the determined primary character.

3. The ML-based computing system of claim 2, wherein the one or more formats comprise Portable Document Format (PDF), Joint Photographic Expert Group image (JPEG), Portable Network Graphics (PNG), Scalable Vector Graphics (SVG), and Web Picture format (WebP), and wherein the one or more elements comprise one or more blocks of texts, one or more tables, and one or more images.

4. The ML-based computing system of claim 1, wherein in generating the one or more scores corresponding to each of the primary character and the one or more alternate characters based on the type of the primary character, the type of the one or more alternate characters, the mis-captured character image and the extracted one or more instances by using the determined ML model, the score generation module is configured to: detect the type of the primary character based on a predefined character information, wherein the type of the primary character is one of a complex primary character and a general primary character;
   detect the type of each of the one or more alternate characters based on the predefined character information, wherein the type of each of the one or more alternate characters is one of: a complex alternate character and a general alternate character;
   determine a ML model based on the detected type of the primary character and the detected type of each of the one or more alternate characters, wherein the ML model is one of: a generic character-based ML model and a complex character-based ML model; and
   generate the one or more scores corresponding to each of the primary character and the one or more alternate characters by comparing the mis-captured character image with the extracted one or more instances by using the determined ML model.

5. The ML-based computing system of claim 1, further comprising a recommendation module configured to recommend the one or more users to replace the mis-captured character image with the predicted correct character.

6. The ML-based computing system of claim 1, wherein in predicting the correct character corresponding to the mis-captured character image from the primary character and the one or more alternate characters by analyzing the one or more document parameters, the predefined threshold score, the set of decision strategic rules and the generated one or more scores by using the trained image prediction-based ML model, the character prediction module is configured to:
   compare the one or more scores of each of the primary character and the one or more alternate characters with the predefined threshold score by using the trained image prediction-based ML model;
   correlate the result of comparison with the one or more document parameters based on the set of decision strategic rules by using the trained image prediction-based ML model; and
   predict the correct character corresponding to the mis-captured character image from the primary character and the one or more alternate characters based on result of correlation.

7. The ML-based computing system of claim 1, wherein the primary characters are characters which are predicted by OCR engines to be a candidate for a given part of the images, and wherein the one or more alternate characters are characters which are predicted by the OCR engines to be a next candidate for the given part of the image.

8. The ML-based computing system of claim 1, further comprising a training module configured to train an image prediction-based ML model, wherein in training the image prediction-based ML model, the training module configured to:
   receive a set of documents from an external database, wherein each of the set of documents has a different font size and a different document structure from each other;
   extract a plurality of characters from each of the received set of documents;
   determine a set of confident characters from the extracted plurality of characters, wherein the set of confident characters are without alternate suggestion; and
   compare the determined set of confident characters with each other based on page number of each of the determined set of confident characters;
   label each of the determined set of confident characters based on result of comparison, wherein a combination of same characters in the determined set of confident characters are labelled as 1, and wherein all characters other than the same characters are labelled as 0; and
   train the image prediction-based ML model on an image level based on the labelled set of confident characters.

9. The ML-based computing system of claim 1, further comprising an alternate character generation module configured to: receive a set of character inputs from the one or more users to correct one or more OCR characters determined by the OCR engine;
   generate a probability distribution of corrections at character level based on the received set of character inputs by using the trained image prediction-based ML model; and determine a set of alternate characters corresponding to the one or more OCR characters based on the generated probability distribution by using the trained image prediction-based ML model.

10. A Machine Learning (ML)-based method for correcting image data, the ML-based method comprising: receiving, by one or more hardware processors, one or more documents from one or more electronic devices associated with one or more users;

scanning, by the one or more hardware processors, the received one or more documents by using an Optical Character Recognition (OCR) engine for obtaining a mis-captured character image present inside the received one or more documents;

determining, by the one or more hardware processors, a primary character and one or more alternate characters corresponding to the mis-captured character image by using the OCR engine;

extracting, by the one or more hardware processors, one or more instances of each of the primary character and the one or more alternate characters from the one or more documents by using a character extraction technique;

generating, by the one or more hardware processors, one or more scores corresponding to each of the primary character and the one or more alternate characters based on a type of the primary character, a type of the one or more alternate characters, the mis-captured character image and the extracted one or more instances by using a determined ML model;

predicting, by the one or more hardware processors, a correct character corresponding to the mis-captured character image from the primary character and the one or more alternate characters by analyzing one or more document parameters, a predefined threshold score, a set of decision strategic rules and the generated one or more scores by using a trained image prediction-based ML model, wherein the one or more document parameters comprise a field of the one or more documents including, context, font, document structure, focus area and upper curves of characters in the one or more documents, type of noise, background of the one or more documents, and ink quality; and automatically replacing, by the one or more hardware processors, the mis-captured character image with the predicted correct character.

11. The ML-based method of claim 10, wherein determining the primary character and the one or more alternate characters corresponding to the mis-captured character image by using the OCR engine comprises:

receiving the one or more documents from the one or more users, wherein the one or more documents are in one or more formats;

splitting the received one or more documents into one or more elements by using coordinates for given characters and an OCR-based ML model;

splitting one or more lines associated with the one or more elements into one or more words by using the OCR-based ML model;

splitting the one or more words into one or more characters by using the OCR-based ML model;

determining the primary character corresponding to each of the one or more characters by comparing the one or more characters with a set of pattern images by using the OCR-based ML model;

generating a probability threshold of the determined primary character by comparing the one or more characters with the determined primary character by using the OCR-based ML model;

classifying the determined primary character into the mis-captured character image if the determined probability threshold of the determined primary character corresponding to each of the one or more characters is below a predefined threshold probability; and determining the one or more alternate characters corresponding to the determined primary character by using the OCR-based ML model if the determined probability threshold of the determined primary character corresponding to each of the one or more characters is below a predefined threshold probability upon classifying the determined character.

12. The ML-based method of claim 11, wherein the one or more formats comprise Portable Document Format (PDF), Joint Photographic Expert Group image (JPEG), Portable Network Graphics (PNG), Scalable Vector Graphics (SVG), and Web Picture format (WebP), and wherein the one or more elements comprise one or more blocks of texts, one or more tables, and one or more images.

13. The ML-based method of claim 10, wherein generating the one or more scores corresponding to each of the primary character and the one or more alternate characters based on the type of the primary character, the type of the one or more alternate characters, the mis-captured character image and the extracted one or more instances by using the determined ML model comprises: detecting the type of the primary character based on a predefined character information, wherein the type of the primary character is one of: a complex primary character and a general primary character;

detecting the type of each of the one or more alternate characters based on the predefined character information, wherein the type of each of the one or more alternate characters is one of a complex alternate character and a general alternate character;

determining a ML model based on the detected type of the primary character and the detected type of each of the one or more alternate characters, wherein the ML model is one of: a generic character-based ML model and a complex character-based ML model; and generating the one or more scores corresponding to each of the primary character and the one or more alternate characters by comparing the mis-captured character image with the extracted one or more instances by using the determined ML model.

14. The ML-based method of claim 10, further comprising a recommendation module configured to recommend the one or more users to replace the mis-captured character image with the predicted correct character.

15. The ML-based method of claim 10, wherein predicting the correct character corresponding to the mis-captured character image from the primary character and the one or more alternate characters by analyzing the one or more document parameters, the predefined threshold score, the set of decision strategic rules and the generated one or more scores by using the trained image prediction-based ML model comprises:

comparing the one or more scores of each of the primary character and the one or more alternate characters with the predefined threshold score by using the trained image prediction-based ML model;

correlating the result of comparison with the one or more document parameters based on the set of decision strategic rules by using the trained image prediction-based ML model; and predicting the correct character corresponding to the mis-captured character image from the primary character and the one or more alternate characters based on result of correlation.

16. The ML-based method of claim 1, wherein the primary characters are characters which are predicted by OCR engines to be a candidate for a given part of the images, and wherein the one or more alternate characters are characters which are predicted by the OCR engines to be a next candidate for the given part of the image.

17. The ML-based method of claim 10, further comprising training an image prediction-based ML model, wherein training the image prediction-based ML model comprises:

receiving a set of documents from an external database, wherein each of the set of documents has a different font size and a different document structure from each other;

extracting a plurality of characters from each of the received set of documents;

determine a set of confident characters from the extracted plurality of characters, wherein the set of confident characters are without alternate suggestion; and comparing the determined set of confident characters with each other based on page number of each of the determined set of confident characters;

labeling each of the determined set of confident characters based on result of comparison, wherein a combination of same characters in the determined set of confident characters are labelled as 1, and wherein all characters other than the same characters are labelled as 0; and training the image prediction-based ML model on an image level based on the labelled set of confident characters.

18. The ML-based method of claim 10, further comprising:

receiving a set of character inputs from the one or more users to correct value of one or more OCR characters determined by the OCR engine;

generating a probability distribution of corrections at character level based on the received set of character inputs by using the trained image prediction-based ML model; and determining a set of alternate characters corresponding to the one or more OCR characters based on the generated probability distribution by using the trained image prediction-based ML model.

19. A non-transitory computer-readable storage medium having instructions stored therein that, when executed by a hardware processor, cause the processor to perform method steps comprising: receiving one or more documents from one or more electronic devices associated with one or more users;

scanning the received one or more documents by using an Optical Character Recognition (OCR) engine for obtaining a mis-captured character image present inside the received one or more documents determining a primary character and one or more alternate characters corresponding to the mis-captured character image from by using the OCR engine;

extracting one or more instances of each of the primary character and the one or more alternate characters from the one or more documents by using a character extraction technique;

generating one or more scores corresponding to each of the primary character and the one or more alternate characters based on a type of the primary character, a type of the one or more alternate characters, the mis-captured character image and the extracted one or more instances by using a determined ML model;

predicting a correct character corresponding to the mis-captured character image from the primary character and the one or more alternate characters by analyzing one or more document parameters, a predefined threshold score, a set of decision strategic rules and the generated one or more scores by using a trained image prediction-based ML model, wherein the one or more document parameters comprise a field of the one or more documents including, context, font, document structure, focus area and upper curves of characters in the one or more documents, type of noise, background of the one or more documents, and ink quality; and automatically replacing the mis-captured character image with the predicted correct character.

20. The non-transitory computer-readable storage medium of claim 19, further comprising recommending the one or more users to replace the mis-captured character image with the predicted correct character.

* * * * *